UNITED STATES PATENT OFFICE.

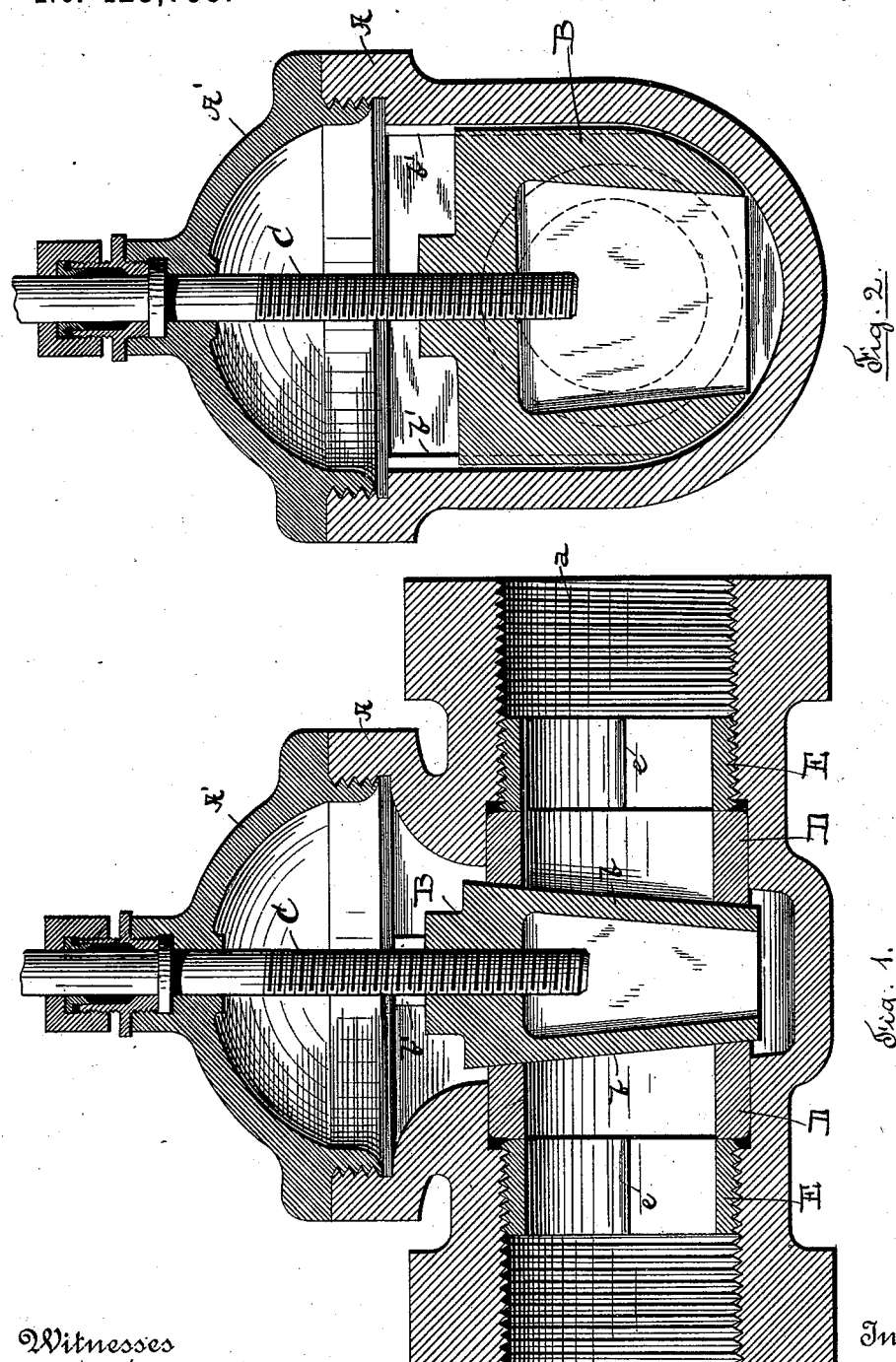

JASON GILES, OF INDIAN ORCHARD, MASSACHUSETTS.

STRAIGHT-WAY VALVE.

SPECIFICATION forming part of Letters Patent No. 423,755, dated March 18, 1890.

Application filed October 4, 1889. Serial No. 325,961. (No model.)

*To all whom it may concern:*

Be it known that I, JASON GILES, of Indian Orchard, in the county of Hampden and State of Massachusetts, have invented a new and useful Improvement in Straight-Way Valves, of which the following is a specification, reference being had to the accompanying drawings, forming part thereof.

My invention relates to gate or straight-way valves, and particularly to that class of such valves in which a gate or plug having its opposite faces tapered is positively guided in its movement in a plane perpendicular to the axis of the water-way extending through the shell and midway between the inner ends of the two branches of said water-way, of which class of valves the well-known Chapman valve is a type.

In this class of valves it has been conclusively demonstrated that a gate made in one piece and positively guided, as described, possesses many advantages over a gate not so guided or one composed of a plurality of parts—such, for example, as the ordinary loose disk gate. Such being the case, and gates made in one piece being capable of being readily made interchangeable, it becomes very desirable that the annular seats on the shell, with which the two faces on the gate co-operate in closing the water-way through the shell, be also interchangeable in their nature, to the end that as soon as one (or both) of said seats becomes worn to such an extent as to impair the tightness of its joint with the gate, or is accidentally injured in any manner, it can be removed from the shell and repaired or replaced by a new one with a minimum amount of trouble and expense.

It is the object of my invention to provide this class of valves with detachable and interchangeable seats within its shell, said seats being simple and inexpensive in construction and capable of being readily introduced within and removed from the shell, and to combine therewith improved means for securely holding said seats in position.

To these ends my invention consists in the valve constructed as hereinafter fully described, and particularly pointed out in the claims.

Referring to the drawings, in which like letters designate like parts in both figures, Figure 1 is a central longitudinal section of a valve embodying my invention. Fig. 2 is a central cross-section thereof.

The letter A designates the shell, having the removable cap A' and having the water-way composed of the two branches $a\ a$ extending therethrough, B the gate, and C the gate-operating spindle, of the well-known Chapman valve. The gate B is provided with the oppositely-located tapered faces $b$, and is guided by means of the ribs $b'$ on the shell, which project within vertical grooves in the edges of the gate in a plane perpendicular to the axis of the water-way as it is moved to open and close said water-way.

The annular seats, which co-operate with the tapered faces of the gate to close the water-way, are formed upon the inner ends of tubular hubs D, adapted to be inserted within the inner ends of the branches $a\ a$ of the water-way. I prefer to make the water-way of a slightly-increased diameter at the inner ends of its two branches, as shown, thereby enabling a hub of greater thickness to be used and securing a broader annular bearing-surface at the inner end thereof than would be practicable otherwise. The hubs D have their inner ends made true and of the proper taper to correspond with the sides of the gate before being inserted within the shell, and preferably have their rear ends slightly rounded, as shown, to facilitate their introduction within the water-way.

In seating said hubs within the shell I prefer to start their outer ends within the inner ends of the two branches of the water-way, cap A' and gate B being removed, and then to employ successively a series of wedges having the same taper as the gate, beginning with a very narrow one and gradually increasing the width thereof, said wedges being guided by the ribs $b'$ and gradually forcing the hubs outwardly within the ends of the water-way, the last wedge employed being of the same thickness as gate B, so that the final position of the hubs is such as to cause their inner ends to make a tight joint with said gate. The corresponding taper of the sides of said series of wedges and of the inner ends of the hubs causes the latter to be forced squarely into the water-way and prevents any revolving movement thereof to change the angle of their inner ends. When said hubs are thus seated within the shell, the tapered sides of the gate will prevent any inward movement thereof, and to hold them from outward movement, as well as to provide for an inward adjustment thereof to compensate for wear of their inner ends, I prefer to provide the water-way from said portions of greater diameter to its outer ends with screw-threads to receive a threaded gland E within each end thereof, which glands, by being screwed within the water-way until their inner ends abut against the hubs D, as shown in Fig. 1, securely hold said hubs against outward movement. As the bearing-faces at the inner ends of the hubs wear away a partial revolution of the glands E will advance the hubs squarely against the gate to compensate for such wear. The glands will be provided with internal ribs e to facilitate turning them, or may have other provision for such purpose. The outer ends of the water-way will be suitably tapered to receive the threaded ends of a pipe in the usual manner.

To remove either or both of the hubs D from the shell, it is necessary simply to remove cap A' and the gate and then to screw the glands inwardly, whereby the hubs are forced from their seats into the open space at the center of the shell, whence they can be readily removed through the opening at the top of the latter.

As thus constructed, it will be observed, a valve with interchangeable gate and seats is provided which can be manufactured at a minimum cost and the seats of which can be inserted within and removed from the shell very quickly and without necessitating the sending of the valve to the manufacturer for such operation. The only accurate machine-work which is required in connection with the valve thus constructed is upon the inner ends of the hubs and the sides of the gate, and this can be done before said parts are entered within the shell and in such manner as to cause any number of said parts to be uniform, and therefore perfectly interchangeable.

The valve constructed according to my invention is of especial value for use under heavy pressures—as, for example, in connection with superheated steam, in which case the gate, hubs, and glands will preferably be made of brass, because of the readiness with which said parts, when worn, can be removed for repair or replaced by new ones.

Attention is called to the fact that by utilizing the threaded glands E to hold the hubs to their working position I avoid the use of pins or other devices extending through the shell into the said hubs, which add considerably to the cost of manufacture, besides necessitating the exercise of much care to cause the holes in the hubs which receive said pins to register with those in the shell. I thereby also avoid the use of clamps or other independent holding devices within the shell, which, besides requiring much time for their adjustment, are always liable to become loosened or broken, and thus interfere with the perfect operation of the valve.

Having thus fully described my invention, what I claim, and desire to secure by Letters Patent, is—

1. The straight-way valve herein described, composed of a shell having a water-way extending therethrough and a gate or plug movable in a plane perpendicular to the axis of said water-way for closing the latter, two tubular hubs located in said water-way upon opposite sides of said gate and bearing against the latter when it is in its closed position, and adjustable stops located within said water-way and bearing against the outer ends of said hubs for holding the latter in position, combined and operating substantially as set forth.

2. The combination, with the shell and gate of a straight-way valve, of tubular hubs detachably seated within said shell and bearing at their inner ends against said gate when the latter is in its closed position, and tubular glands adjustably secured within the water-way of said shell and bearing at their inner ends against the outer ends of said hubs, substantially as and for the purpose described.

3. In a straight-way valve, a shell having its water-way of greater diameter at the center than at the ends thereof, two tubular hubs seated in said water-way in said portion of greater diameter and having their inner ends formed into annular seats, and two tubular glands adjustably secured within the portion of said water-way of lesser diameter and bearing against the outer ends of said hubs, respectively, combined and operating substantially as described.

4. In a straight-way valve, a shell having its water-way of greater diameter at the center than at the ends thereof, and having the portion of lesser diameter interiorly threaded, in combination with a gate movable upon guides within said shell in a plane bisecting said water-way, two tubular hubs seated within said water-way in said portion of greater diameter and upon opposite sides of the plane of movement of said gate, and two exteriorly-threaded tubular glands constructed to be screwed within said portion of the water-way of lesser diameter against said hubs, respectively, substantially as set forth.

5. In a straight-way valve, the combination, with shell A, having the removable cap A', gate B, having the tapering faces b and movable upon guides b', and gate-operating spindle C, of hubs D, having tapering annular seats upon their inner ends, as described, said hubs being located within the inner ends of the water-way through the shell and upon opposite sides of said gate, and exteriorly-threaded glands E, located within said water-way and bearing, respectively, against said hubs, said glands being provided with the internal ribs $e$, substantially as and for the purpose set forth.

JASON GILES.

Witnesses:
W. H. CHAPMAN,
J. E. CHAPMAN.